(12) United States Patent
Gal et al.

(10) Patent No.: US 8,370,937 B2
(45) Date of Patent: Feb. 5, 2013

(54) HANDLING OF DDOS ATTACKS FROM NAT OR PROXY DEVICES

(75) Inventors: Tamir Gal, Nofit (IL); Keren Horowitz, Hod Hasharon (IL); Dan Touitou, Ramat Gan (IL)

(73) Assignee: Cisco Technology, Inc., San Jose, CA (US)

( * ) Notice: Subject to any disclaimer, the term of this patent is extended or adjusted under 35 U.S.C. 154(b) by 875 days.

(21) Appl. No.: 11/999,131

(22) Filed: Dec. 3, 2007

(65) Prior Publication Data

US 2009/0144806 A1 Jun. 4, 2009

(51) Int. Cl.
*H04L 29/06* (2006.01)

(52) U.S. Cl. .......................................................... 726/23

(58) Field of Classification Search ........................ None
See application file for complete search history.

(56) References Cited

U.S. PATENT DOCUMENTS

| | | | |
|---|---|---|---|
| 5,889,943 A | 3/1999 | Ji et al. | |
| 5,960,170 A | 9/1999 | Chen et al. | |
| 5,991,881 A | 11/1999 | Conklin et al. | |
| 6,055,236 A | 4/2000 | Nessett et al. | |
| 6,185,680 B1 | 2/2001 | Shimbo et al. | |
| 6,279,113 B1 | 8/2001 | Vaidya | |
| 6,321,338 B1 | 11/2001 | Porras et al. | |
| 6,397,335 B1 | 5/2002 | Franczek et al. | |
| 6,487,666 B1 | 11/2002 | Shanklin et al. | |
| 6,502,135 B1 | 12/2002 | Munger et al. | |
| 6,513,122 B1 | 1/2003 | Magdych et al. | |
| 6,629,137 B1 | 9/2003 | Wynn | |
| 6,725,378 B1 | 4/2004 | Schuba et al. | |
| 6,789,203 B1 | 9/2004 | Belissent | |
| 6,829,654 B1 | 12/2004 | Jungck | |
| 6,856,627 B2 | 2/2005 | Saleh et al. | |
| 6,880,090 B1 | 4/2005 | Shawcross | |
| 6,886,102 B1 | 4/2005 | Lyle | |
| 6,907,525 B2 | 6/2005 | Pazi et al. | |
| 6,922,417 B2 | 7/2005 | Vanlint | |
| 7,007,302 B1 | 2/2006 | Jagger et al. | |
| 7,171,683 B2 | 1/2007 | Pazi et al. | |
| 7,243,141 B2 | 7/2007 | Harris | |
| 7,313,815 B2 | 12/2007 | Pazi et al. | |
| 2001/0039579 A1 | 11/2001 | Trcka et al. | |
| 2001/0042200 A1 | 11/2001 | Lamberton et al. | |
| 2002/0083175 A1 | 6/2002 | Afek et al. | |
| 2002/0169875 A1 * | 11/2002 | Furui et al. ................... 709/225 |
| 2003/0110274 A1 | 6/2003 | Pazi et al. | |
| 2003/0172289 A1 | 9/2003 | Soppera | |
| 2003/0200464 A1 | 10/2003 | Kidron | |
| 2004/0003116 A1 | 1/2004 | Munger et al. | |

(Continued)

OTHER PUBLICATIONS

Bennett, J.C.R. et al. "Hierarchical Packet Fair Queueing Algorithms", 1996.

(Continued)

*Primary Examiner* — Gilberto Barron, Jr.
*Assistant Examiner* — Simon Kanaan
(74) *Attorney, Agent, or Firm* — Baker Botts L.L.P.

(57) ABSTRACT

A method for authenticating communication traffic includes receiving an initial incoming message, sent over a network from a source address to a destination address. In reply to the initial incoming message, an outgoing message containing an encoded token is sent to the client. Upon receiving a number of further incoming messages from the source address containing the encoded token, delivery of one or more of the further incoming messages to the destination address is inhibited when the number exceeds a predetermined threshold.

19 Claims, 2 Drawing Sheets

U.S. PATENT DOCUMENTS

| | | | |
|---|---|---|---|
| 2004/0093513 | A1 | 5/2004 | Cantrell et al. |
| 2004/0199791 | A1 | 10/2004 | Poletto et al. |
| 2004/0221190 | A1 | 11/2004 | Poletto et al. |
| 2004/0250124 | A1 | 12/2004 | Chesla et al. |
| 2005/0021740 | A1 | 1/2005 | Bar |
| 2005/0089016 | A1 | 4/2005 | Zhang et al. |
| 2005/0166049 | A1 | 7/2005 | Touitou et al. |
| 2007/0044143 | A1* | 2/2007 | Zhu et al. .......................... 726/8 |
| 2007/0266426 | A1* | 11/2007 | Iyengar et al. .................... 726/5 |

OTHER PUBLICATIONS

Bennett, J.C.R. et al. "High Speed, Scalable, and Accurate Implementation of Fair Queueing Algorithms in ATM Networks", 1996.

Bennett, J.C.R. et al. "WF2Q: Worst-Case Fair Weighted Fair Queueing", 1996.

Chiussi, F.M. et al. "Implementing Fair Queueing in ATM Switches: The Discrete-Rate Approach", 1998.

Chiussi, F.M. et al. "Minimum-Delay Self-Clocked Fair Queueing Algorithm for Packet-Switched Networks", 1998.

Demers, A. et al. "Analysis and Simulation of a Fair Queueing Algorithm", 1989 Association for Computing Machinery.

Eckhardt, D.A. et al. "Effort-limited Fair (ELF) Scheduling for wireless Networks", IEEE INFOCOM 2000.

Golestani, S.J. "Networks Delay Analysis of a Class of fair Queueing Algorithms", IEEE Journal on Selected Areas in Communications, vol. 13, No. 6, Aug. 1995, pp. 1057-1070.

Golestani, S.J. "A self-Clocked fair Queueing Scheme for Broadband Applications", IEEE 1994, pp. 5c.1.1-5c1.11.

Greenberg, Albert G. et al. "How Fair is Fair Queuing?" Journal of the Association for Computing Machinery vol. 39, No. 3, Jul. 1992, pp. 568-598.

Parekh, A.K.J. "A Generalized Processor Sharing Approach to Flow Control in Integrated Services Networks", Ph.D. Dissertation Massachusetts Institute of Technology, Feb. 1992.

Parekh, A.K.J. "A Generalized Processor Sharing Approach to Flow Control in Integrated Services Networks: The Multiple Node Case", IEEE/ACM Transactions on Networking vol. 2, No. 2, Apr. 1994, pp. 137-150.

Parekh, A.K.J. "A Generalized Processor Sharing Approach to Flow Control in Integrated Services Networks: The Single-Node Case", IEEE/ACM Transactions on Networking vol. 1, No. 3, Jun. 1993, pp. 344-357.

"Quality of Service Networking", downloaded from the web (address: http://www.cisco.com/univercd/cc/td/doc/cisintwk/ito_doc/qos.htm), Cisco Systems, Inc. 2002.

Rexford, J.L. et al. "Hardware Efficient Fair Queueing Architectures for high-Speed networks", IEEE 1996, pp. 5d.2.1-5d.2.9.

Shreedhar M. et al. "Efficient Fair Queueing Using Deficit Round-Robin", IEEE/ACM Transactions on networking vol. 4, No. 3, Jun. 1996, pp. 375-385.

Stiliadis, D. et al. "Frame-Based Fair Queueing: A New Traffic Scheduling Algorithm for Packet-Switched Networks", Jul. 1995, pp. 1-43.

Robert Stone, Center Track, An IP Overlay Network for Tracking Denial-of-Service Floods, MANOG17, Oct. 5, 1999, UUNET Technologies.

Robert Stone, "Center Track: An IP Overlay Network for Tracking DoS Floods", Proceedings of the 9th USENIX Security Symposium, Denver, Colorado, USA, Aug. 14-17, 2000.

D. Kristol, et al., "HTTP State Management Mechanism", RFC 2109, Feb. 1997.

D. Fielding, et al., "Hypertext Transfer Protocol—HTTP/1.1", RFC 2616, Jun. 1999.

U.S. Appl. No. 11/050,887, filed Feb. 3, 2005.

* cited by examiner

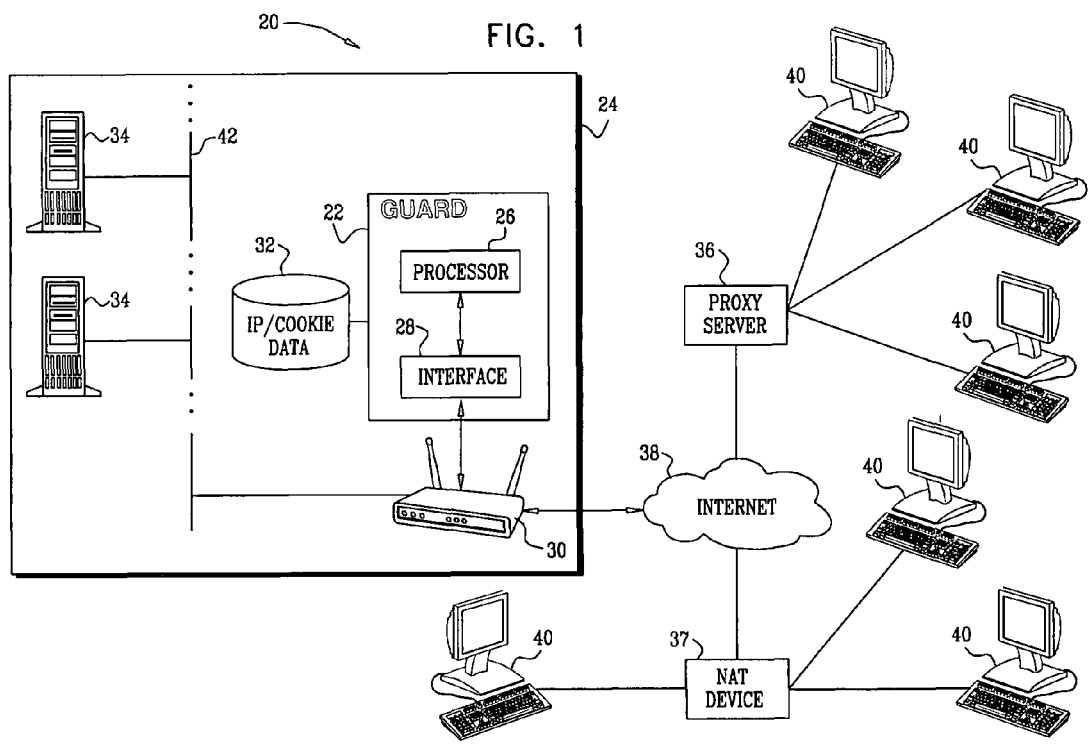

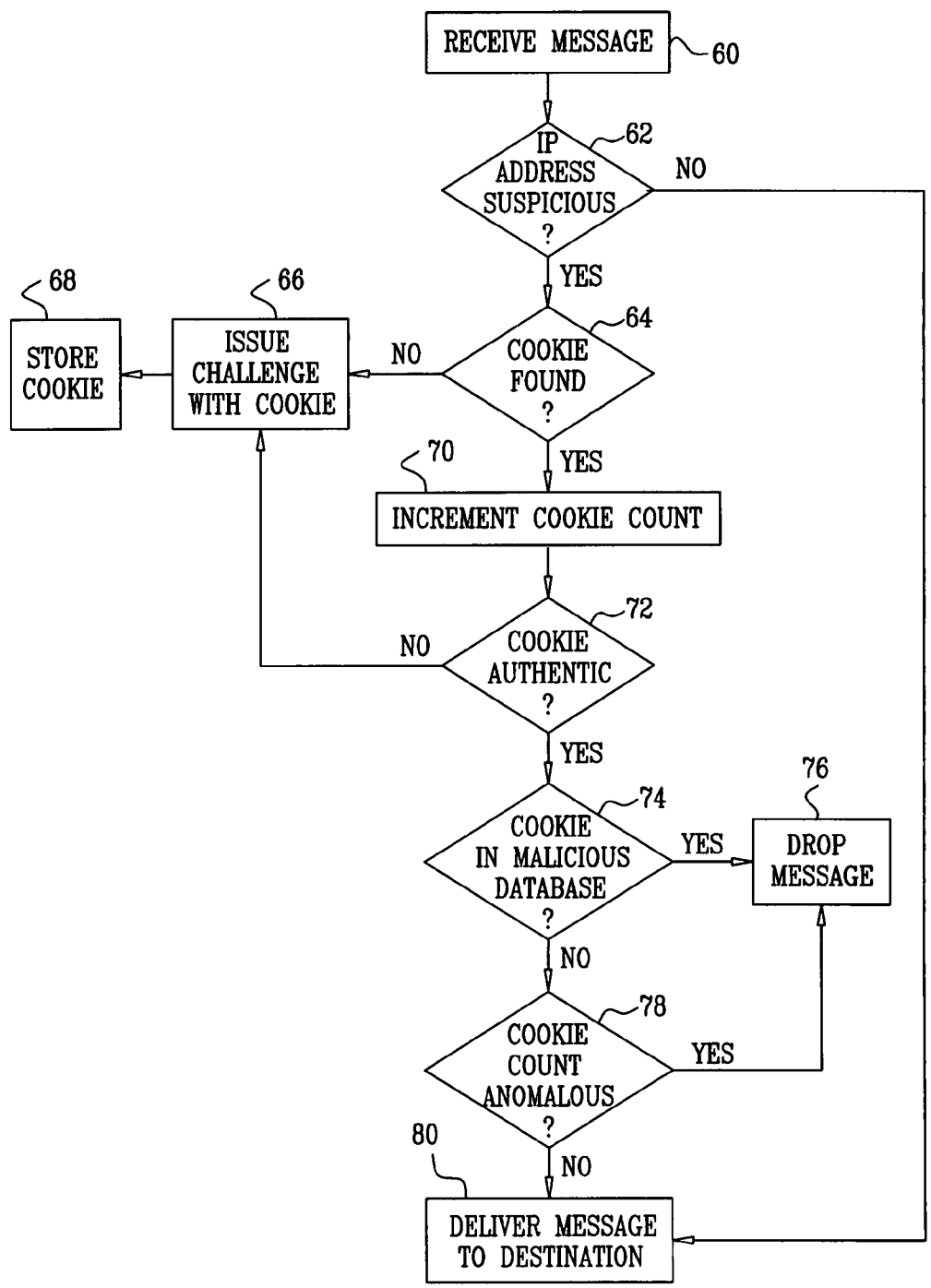

HANDLING OF DDOS ATTACKS FROM NAT OR PROXY DEVICES

FIELD OF THE INVENTION

The present invention relates generally to computer networks, and specifically to methods and systems for protecting against denial of service attacks in computer networks.

BACKGROUND OF THE INVENTION

In a Denial-of-Service (DoS) attack, an attacker bombards a victim network or server with a large volume of message traffic. Handling this traffic consumes the victim's available bandwidth, CPU capacity, or other critical system resources, and eventually brings the victim to a situation in which it is unable to serve its legitimate clients. Distributed DoS (DDoS) attacks can be even more damaging, as they involve creating artificial network traffic from multiple sources simultaneously. In a "conventional" massive-bandwidth attack, the source of the attack may be traced with the help of statistical analysis of the source Internet Protocol (IP) addresses of incoming packets. The victim can subsequently filter out any traffic originating from the suspect IP addresses, and can use the evidence to take legal action against the attacker.

U.S. Patent Application Publication 2005/0166049, whose disclosure is incorporated herein by reference, describes a method for resisting a "zombie attack." A zombie attack is a type of DDoS attack in which an attacker attempts to control a large number of servers on the Internet by using "worms," which are malicious programs that self-replicate across the Internet by exploiting security flaws in widely-used services. After taking control of a computer, a worm often uses the computer to participate in a DDoS attack, without any knowing collaboration on the part of the computer user. Infected computers that participate in this sort of mass malicious activity are referred to as "zombies." To deal with zombie attacks, a network guard system challenges sources of incoming message traffic to determine whether the sources comply fully with higher-level communication protocols, such as Hypertext Transfer Protocol (HTTP) (including features of Hyper-Text Markup Language [HTML]) or Domain Name System (DNS), which operate above the transport layer (typically Transmission Control Protocol [TCP] or User Datagram Protocol [UDP]). Failure of a computer at a given source IP address to comply with the higher-level protocol indicates that the source may be a zombie, and incoming messages from this source are therefore blocked.

BRIEF DESCRIPTION OF THE DRAWINGS

The present invention will be more fully understood from the following detailed description of the embodiments thereof, taken together with the drawings in which:

FIG. 1 is a block diagram that schematically illustrates a computer network with a guard system, in accordance with an embodiment of the present invention; and FIG. 2 is a flow chart that schematically illustrates a method for protecting against DDoS attacks, in accordance with an embodiment of the present invention.

DETAILED DESCRIPTION OF EXAMPLE EMBODIMENTS

Overview

Protection from DDoS attacks is often provided by detecting the source Internet Protocol (IP) address or addresses generating the attack and filtering illegitimate message traffic by blocking or rate-limiting traffic originating from the identified source addresses. One such method is described, for example, in U.S. patent application Ser. No. 11/050,887, filed Feb. 3, 2005, which is assigned to the assignee of the present application and whose disclosure is incorporated herein by reference. The method includes authenticating a source address by handshaking between a guard system and an unauthenticated source. When the guard system intercepts a message from the unauthenticated source, it sends a message to the source and awaits response. If the guard system is able to solicit the unauthenticated source to respond to the message, and if it can ascertain that the same client generated both the response and the original intercepted message, then it has sufficient grounds for authenticating this source address and allowing further traffic from the source address to reach its destination.

A significant challenge to mitigating DDoS attacks is that malicious packets may be relayed through NAT devices or proxy servers, which send messages from multiple clients while using the same source IP address for all of the clients. Devices that perform this sort of function are referred to herein collectively as "common-address relay devices." Some of the network traffic these devices transmit may be from legitimate clients in addition to the artificial network traffic created for the attack. Therefore, blocking all incoming traffic from an IP address of a NAT device or proxy server may result in a denial of service to legitimate clients.

A network address translation (NAT) device resides between a set of clients on an internal network, such as Internet Service Provider (ISP) customers, and a public network, such as the Internet. The NAT device has one or more "public" IP addresses on the Internet. As traffic passes from the local clients to the Internet, the source address in each message is translated on the fly from the clients' private addresses to the public address(es). When a reply returns to the NAT device, the device uses connection tracking data stored during the outbound phase to determine where on the internal network to forward the reply. To a system on the Internet, the NAT device itself appears to be the source/destination for this traffic.

In a similar manner a proxy server services the requests of its clients by forwarding them to other servers. A client connects to the proxy server, requesting some service, such as a file, connection, or web page, available from a different server. The proxy server provides the resource by connecting to the specified server and requesting the service on behalf of the client. In some configurations, a proxy server has its own IP address and uses this address in sending messages from multiple clients.

Embodiments of the present invention provide methods for resisting DoS attacks in which malicious traffic originates behind a NAT or proxy server, so that both legitimate and malicious traffic may share the same IP source address. These authentication methods include:

Requiring that all messages from a source address (or all messages of a particular type, such as HTTP requests) that is suspected of transmitting malicious traffic contain an encoded token, such as a special cookie. The cookies are distributed to clients in a way that ensures that every client has a distinct cookie. One way of inserting the cookies when the guard system is in-line with the server (as in a firewall, for example) is to for the guard system to add cookies to the response messages sent by the server. If too many incoming messages are then received that do not contain a cookie, it may imply that an attack is underway.

The guard system may then respond by restricting traffic to the server to messages that have been authenticated as explained hereinbelow.

Handshaking between a guard system and an unauthenticated client, wherein the guard system intercepts an incoming message from the unauthenticated client, adds a unique cookie, sends an outgoing message to the client and awaits response. If the unauthenticated client responds with a new incoming message containing the cookie, the guard system has sufficient grounds for authenticating this client and allowing further traffic from the client to reach its destination. Malicious clients behind the NAT device or proxy server that are incapable of following directions and responding properly will be blocked without impacting the rest of the clients behind the NAT device or proxy server.

Monitoring the count of all messages that are accompanied by a cookie. Whenever an anomalous number of messages with an identical cookie are received, incoming messages containing this cookie can be throttled or blocked entirely, without substantial impact upon other clients behind the NAT device or proxy server. (An "anomalous" number in this context typically means a significantly larger number of messages than would be expected by comparison with a certain threshold. This threshold may be determined, for example, by the number of messages transmitted from other sources or by a baseline number of messages transmitted from this source or other sources during "peacetime," when no attack is believed to be in progress.)

System Description

FIG. 1 is a block diagram that schematically illustrates a computer network system 20, in accordance with a preferred embodiment of the present invention. A guard system 22 comprises a guard processor 26 which performs the various protection and authentication methods described herein, and a network interface 28, which communicates via a router 30 with other components of system 20 and with a wide-area network (WAN) 38, such as the Internet. A protected area 24 of computer network system 20 communicates with WAN 38 through one or more routers 30. Protected area 24 comprises various network elements such as servers 34, clients, switches, internal routers, and bridges, typically connected by one or more local-area networks (LANs) 42.

In the description that follows, it will be assumed that at least one of servers 34 is a HTTP server, which receives and responds to HTTP requests from clients 40. Some of these HTTP requests to server 34 are relayed by a proxy server 36 or a NAT device 37 on the behalf of their clients 40. The requests relayed by a given proxy server or NAT device all share the same source IP address. Although the present embodiment is described with specific reference to HTTP, however, the principles of the present invention may similarly be applied in protection of servers (and other computers) that operate in accordance with other protocols that support the use of encoded tags. (For example, the above-mentioned U.S. patent application Ser. No. 11/050,887 describes the use of cookies in authenticating Voice over IP traffic, while U.S. Pat. No. 6,907,525, whose disclosure is incorporated herein by reference, describes the use of cookies in authenticating DNS messages.) Furthermore, although guard system 22 is described hereinbelow, for the sake of simplicity, as protecting a single HTTP server 34, in practice one or more guard systems of this sort may be deployed to protect a group of computers, such as a cluster of servers or an entire LAN.

To prevent DDoS attacks on server 34, guard system 22 intercepts incoming HTTP request messages from network 38 that are addressed to server 34. Guard processor 26 checks the IP source address and cookie (if included) of each message that it intercepts against reference values stored in a database 32 or other data structure. Methods for generating these reference values—indicating which requests are legitimate, and which may have originated from malicious clients—are described further hereinbelow. The guard processor blocks illegitimate requests from passing through to server 34.

The configuration and operation of guard system 22 are shown and described herein by way of example, and alternative configurations and modes of operation will be apparent to those skilled in the art. For example, rather than being connected in the "lollipop" configuration that is shown in FIG. 1, via router 30, the guard system may be in-line with server 34 (as part of a firewall or load balancer, for example). Alternatively or additionally, functions of the guard system may be integrated into the router or server or into other network equipment.

Typically, guard system 22 comprises a general-purpose computer, which is programmed in software to carry out the functions described herein. The software may be downloaded to the computer in electronic form, over a network, for example, or it may alternatively be supplied to the computer on tangible media, such as CD-ROM. Further alternatively, guard system 22 may be implemented in dedicated hardware logic, or using a combination of hardware and software elements.

DDOS Attack Handling

FIG. 2 is a flow chart that schematically illustrates a method for handling DDoS attacks attempted against server 34, in accordance with an embodiment of the present invention. The techniques illustrated in FIG. 2 and described hereinbelow are particularly effective in dealing with traffic originating from clients 40 communicating via proxy server 36 or NAT device 37. These techniques may be implemented by guard system 22 in conjunction with other techniques for identifying source addresses of malicious traffic and filtering such traffic, such as the methods described in the above-mentioned U.S. patent applications.

Guard system 22 intercepts an HTTP message, in a message reception step 60. In the configuration shown in FIG. 1, router 30 redirects some or all of the messages destined for server 34 to the guard system. The guard system checks the source IP address of the message to see if it matches any of the suspect source IP addresses stored in database 32, in an IP address verification step 62. The guard system may consider an address to be suspicious, for example, if an unusually large number of incoming packets have originated from that address. (Because a proxy server or NAT device may typically transmit a relatively large number of packets, originating from different clients, to server 34, the IP address of the proxy server or NAT device may often be considered suspicious.) If the IP address of the message is not found to be suspicious, the message is passed to server 34, in a message delivery step 80.

In a typical embodiment of the invention, message redirection by router 30 and verification processing by guard system 22 are configured to be flexible and may only be required when suspicious behavior is detected, such as when an unusually large quantity of incoming messages is received. In "peace time," when no suspicious behavior is detected, all incoming traffic may be passed directly to server 34. On the other hand, when a DDoS attack is taking place (as indicated by detection of anomalous traffic conditions), all incoming traffic may be deemed suspicious and processed as described below. Alternatively, router 30 may be configured to divert to guard system 22 only certain types of traffic and/or traffic from certain source addresses or ranges of addresses.

If the source IP address of the message is found to be suspicious, the guard system checks whether the message contains a cookie, in a cookie detection step 64. In general, the guard system will pass a message on to server 34 only if the message contains a valid cookie. If the message does not contain such a cookie, the guard system sends a new cookie back to the client, in a challenge step 66. At this step, for example, the guard system may send the cookie to the client using the HTTP 200 OK response with the "Set-Cookie" HTTP header in addition to an HTTP "close connection" response, as provided by Request for Comments (RFC) 2109 of the Internet Engineering Task Force (IETF), entitled "HTTP State Management Mechanism," by Kristol et al. (available at www.ietf.org). This HTTP response serves as a challenge to the client to return the state information in a new message using the "Cookie" HTTP header. The guard system stores the cookie in database 32, in a cookie storage step 68, for use in validating subsequent messages from the client that contain the cookie.

The "Set-Cookie" response header contains the value "GUARD-NAME=cookie," wherein cookie is a new unique sequence of characters generated by the guard system. Typically, the cookie value is encrypted to ensure authenticity. Methods that may be used for generation of such cookies are described, for example, in the above-mentioned U.S. patent application Ser. No. 11/050,887.

The HTTP response that the guard system sends at step 66 may also contain a HTML meta-equiv refresh instruction along with a HTTP close-connection header. This instruction will force the client to resend its original message on a new connection, this time with the issued cookie attached to it. As a result, malicious clients that are incapable of following HTML instructions (such as types of "zombies" that are described in the above-mentioned U.S. Patent Application Publication 2005/0166049) will be blocked. On the other hand, legitimate clients will still be able to communicate with server 34, even if these legitimate clients transmit their messages through the same NAT or proxy device as the malicious clients (so that the messages reaching guard system 22 have the same source IP address).

If the guard system finds a valid cookie in the received message at step 64, it increments the count of the number of messages received containing this cookie, in a cookie tracking step 70. This count is used in preventing attackers from using the same cookie in a large number of malicious requests to the server, as explained below. The guard system next determines whether the message cookie is valid, in a cookie authentication step 72. The guard system considers the received cookie to be valid if it matches a cookie previously issued by the guard system. If the guard system is unable to match the received cookie to an issued cookie stored in database 32, the received message fails the authentication step. The guard system then drops the unauthorized message, in message blocking step 76, and sends a new cookie back to the client, in challenge step 66, along with a close-connection header.

If the guard system succeeds in matching the received cookie to a cookie in the issued cookies list, the received cookie is then compared with the list of malicious cookies stored in the database, in a malice determination step 74. Cookies may be classified as malicious on various grounds, including having been used in too many messages, as determined below at step 78. For example, if a received cookie arrives after a certain timeout period (which may be set by an operator of the guard system), it may indicate that it is malicious.

Alternatively, the issued cookie may include embedded data from the first received message. If the received cookie fails to contain the issued embedded data, it may imply that the cookie was not sent by the client it had been intended for, an indication of a malicious cookie. For example, a received message may include a Time To Live (TTL) or "hop count" field to help prevent messages from persisting (e.g. going in circles) on a network. Each packet switch (or router) that the message crosses decrements the TTL field by one. When the TTL field value reaches zero, the message is no longer forwarded by a packet switch and is discarded. The TTL value from the first received message can be embedded in the issued cookie, as described, for example, in the above-mentioned U.S. patent application Ser. No. 11/050,887. The embedded TTL value in the received cookie can be compared with the TTL value embedded in the issued cookie. If the TTL values do not match, the received cookie may be classified as malicious.

If the guard system matches the received cookie to a malicious cookie at step 74, then the received message is dropped in message blocking step 76. In addition to the dropping the received message, the guard system may respond to the message with HTTP status code 401 (unauthorized). Again, this step enables the guard system to block malicious messages without preventing legitimate clients from communicating with server 34, even if the legitimate clients transmit their messages through the same NAT or proxy device as the malicious clients.

The guard system then analyzes the number of received messages associated with the received cookie, in a cookie counting step 78, using the count made at step 70. An anomalous (i.e., unusually large) number of messages received with a certain cookie raises the level of suspicion associated with these messages. For example, a malicious user may obtain a legitimate cookie from the guard system, and may then attach the cookie to a large number of messages in an attack on server 34. To prevent this sort of attack, the guard system compares the cookie count to a certain threshold at step 78. The threshold may be set manually by an operator of the guard system or may be learned automatically by the guard system based on "peacetime" behavior. For this latter purpose, the guard system may issue cookies to non-suspicious clients, and then gather statistics on the number of requests in which each cookie appears over time.

Guard system 22 adds the cookie to the list of malicious cookies if the count is in excess of the threshold. Additionally, the guard system typically drops this message at step 76 and may block or limit the number of additional messages containing the malicious cookie that are allowed to reach the server. Legitimate clients, who use their cookies in normal numbers of messages, are not affected.

Messages containing authenticated guard cookies originating from a proxy server, NAT device, or other network source in a normal fashion are passed directly to server 34, in a message delivery step 80.

A sophisticated attacker may be able to configure multiple clients to respond successfully to the challenge issued by guard system 22 at step 66, and thus may obtain a large number of valid cookies for use in an attack. To prevent this sort of attack, the guard system may also count the total number of cookies issued to a specific IP source address (which may be a NAT or proxy device). If the guard system determines that the number of cookies issued to a given IP address has exceeded an expected usage threshold, it may restrict issuance of additional cookies to this IP address or limit the number of incoming messages from this IP source address for a period of time. This restriction will help to prevent the attacker from acquiring and using cookies for malicious purposes, though at the expense of preventing legitimate clients from making initial contact with server 34. (Clients who acquired a valid cookie previously may continue to communicate with the server using the cookie.)

Proxy servers may "pipeline" their messages on the behalf of their clients. In pipelining, as described in HTTP/1.1 (IETF RFC 2616, June, 1999), multiple HTTP request messages may be sent in succession to a HTTP server over a single Transmission Control Protocol (TCP) connection without waiting for corresponding responses. The HTTP server is then expected to send reply messages in the same order in which the request messages arrive. A proxy server may pipeline HTTP messages from multiple different clients, some containing cookies and others without cookies. Guard system 22 should pass the messages with valid cookies through to server 34 at step 80, while blocking the cookie-less messages and sending challenge messages containing new cookies, at step 66, to the clients who sent the cookie-less messages. To comply with the requirements of HTTP/1.1 and ensure that the proxy server distributes the responses from the server and the guard system to the appropriate clients, the guard system must interleave the challenge to the proxy server at the proper point in the order of the reply messages sent by the HTTP server.

In order to determine that a sequence of pipelined requests was sent by a proxy server, guard system 22 monitors the TCP acknowledgment (ACK) numbers of the incoming requests. (The ACK number is a value sent by client 40 in the TCP header that equals the sender's sequence number (SEQ) plus the length of data that was sent at the TCP layer.) If the ACK numbers do not progress in sequence from one request to the next, the guard system may safely assume that a proxy server has pipelined requests from multiple clients.

When guard system 22 is in-line with server 34, the guard system is able to monitor both incoming messages to server 34 and outgoing messages from the server. The guard system can thus determine when the response messages have been sent to proxy server 36 and insert the challenge message containing the cookie at the appropriate time in the message sequence in order to maintain the correct ordered pipeline of message responses.

When the guard system is configured to receive only incoming messages from clients (as in the lollipop configuration of FIG. 1, for example), responding to pipelined requests requires additional information in order for the guard system to issue the challenge message at the correct time. Therefore, when the guard system receives a request message without a cookie in a sequence of pipelined request messages from proxy server 36, it may stop delivering additional request messages from the proxy server to server 34 (and/or prevent the proxy server from sending further requests by sending a TCP segment to the proxy server with window size=0). The guard system then waits until all the response messages to previous request messages have been sent from server 34 before sending the challenge in response to the cookie-less request. For this purpose, the guard system may analyze the ACK numbers of the incoming messages to verify that the clients have received the server's responses to their previous request messages before sending the challenge.

An alternative solution for guard system 22 to manage pipelined messages when it is not in line with server 34 is to allow all pipelined proxy message traffic to be delivered directly to the server without a challenge (including messages that lack an authentic issued cookie). Since relatively few proxy servers pipeline together messages from different clients, this alternative solution will not have a significant impact upon the safety or resources of server 34.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for authenticating communication traffic, comprising:
    receiving an initial incoming message, sent over a network to a destination address from a client and having a source address, wherein the client is unauthenticated and is one of a plurality of clients whose messages have the source address in common;
    in reply to the initial incoming message, sending an outgoing message to the client containing a distinct cookie which is distinct for the client among the plurality of clients whose messages have the source address;
    receiving a subsequent incoming message from the client;
    if the subsequent incoming message contains the distinct cookie, authenticating the client, otherwise blocking the subsequent incoming message;
    maintaining, by a processor, a count of additional incoming messages from the source address and containing the distinct cookie; and
    inhibiting delivery of one or more of the additional incoming messages to the destination address when the count exceeds a predetermined threshold.

2. The method according to claim 1, wherein sending the outgoing message comprises storing the distinct cookie, and wherein authenticating the client comprises comparing a cookie contained in the further incoming message to the stored distinct cookie.

3. The method according to claim 2, wherein authenticating the client comprises conveying the further incoming message to the destination address upon determining that a cookie contained in the further incoming message matches the stored distinct cookie.

4. The method according to claim 1, wherein sending the outgoing message comprises inhibiting the delivery and sending the outgoing message in response to detecting a high rate of incoming traffic from the source address.

5. The method according to claim 1, and comprising determining a baseline number of incoming messages that are expected to contain the distinct cookie while an attack is not in progress, and setting the threshold responsively to the baseline number.

6. The method according to claim 1, wherein sending the outgoing message comprises sending multiple respective outgoing messages containing respective distinct cookies to the plurality of clients via the source address.

7. The method according to claim 6, wherein inhibiting the delivery comprises blocking the one or more additional incoming messages having the source address from a first client of the plurality of clients, while conveying at least one of the additional incoming messages having the source address from a second client of the plurality of clients to the destination address responsively to the distinct cookie contained in the at least one of the additional incoming messages.

8. The method according to claim 6, wherein the incoming messages are received from a common-address relay device, which is selected from a group of devices consisting of a proxy server and a network address translation (NAT) device.

9. The method according to claim 8, wherein the additional incoming messages are pipelined by the proxy server in a pipeline order together with an extra incoming message that does not contain a respective distinct cookie, and wherein sending the outgoing message comprises interleaving the outgoing message in reply to the extra incoming message in a sequence of replies to the additional incoming messages responsively to the pipeline order.

10. The method according to claim 1, wherein the initial and subsequent incoming messages comprise Hypertext Transfer Protocol (HTTP) requests.

11. Apparatus for authenticating communication traffic, comprising:
a network interface, which is arranged to communicate with a network; and
a guard processor, which is coupled to the network interface and is arranged:
to receive an initial incoming message sent over the network to a destination address from a client and having a source address, wherein the client is unauthenticated and is one of a plurality of clients whose messages have the source address;
to send an outgoing message to the client containing a distinct cookie which is distinct for the client among the plurality of clients whose messages have the source address in common;
to receive a subsequent incoming message from the client;
if the subsequent incoming message contains the distinct cookie, authenticating the client, otherwise blocking the subsequent incoming message;
to maintain a count of additional incoming messages from the source address and containing the distinct cookie; and
to inhibit delivery of one or more of the additional incoming messages to the destination address when the count exceeds a predetermined threshold.

12. The apparatus according to claim 11, wherein the guard processor is configured to store the distinct cookie and to authenticate the client by comparing a cookie contained in the further incoming message to the stored distinct cookie.

13. The apparatus according to claim 12, wherein the guard processor is configured to convey the further incoming message to the destination address upon determining that a cookie contained in the further incoming message matches the stored distinct cookie.

14. The apparatus according to claim 11, wherein the guard processor is configured to send the outgoing message in response to detecting a high rate of incoming traffic from the source address.

15. The apparatus according to claim 11, wherein the guard processor is configured to determine a baseline number of incoming messages that are expected to contain the distinct cookie while an attack is not in progress, and to set the threshold responsively to the baseline number.

16. The apparatus according to claim 11, wherein the guard processor is configured to send multiple respective outgoing messages containing respective distinct cookies to the plurality of clients via the source address.

17. The apparatus according to claim 16, wherein the incoming messages are received from a common-address relay device, which is selected from a group of devices consisting of a proxy server and a network address (NAT) device.

18. The apparatus according to claim 11, wherein the initial and subsequent incoming messages comprise Hypertext Transfer Protocol (HTTP) request.

19. A method, comprising:
receiving at a processor a first message from a first client of a plurality of clients, the first message identifying a source address of the first client and a destination address;
receiving at the processor a second message from a second client of the plurality of clients, the second message indicating that the same source address is the source address of the second client;
responding to the first message by sending a third message to the first client, the third message including a first cookie that is distinct from a second cookie sent to the second client in response to the second message from the second client;
in response to receiving a fourth message from the first client and determining that the source address of the first client identified in the fourth message does not match any of a plurality of suspicious source addresses stored in a database and that the fourth message includes the first cookie, incrementing by the processor a counter value that tracks the number of times the first cookie has been received; and
inhibiting delivery to the destination address of one or more additional messages that include the first cookie upon a determination that the counter value exceeds a predetermined threshold.

* * * * *